May 14, 1946.   R. W. CLARK   2,400,190
MULTIRANGE METER
Filed Jan. 12, 1944
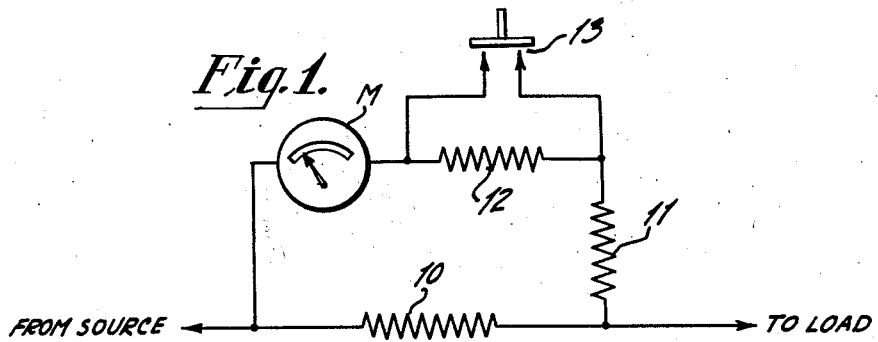
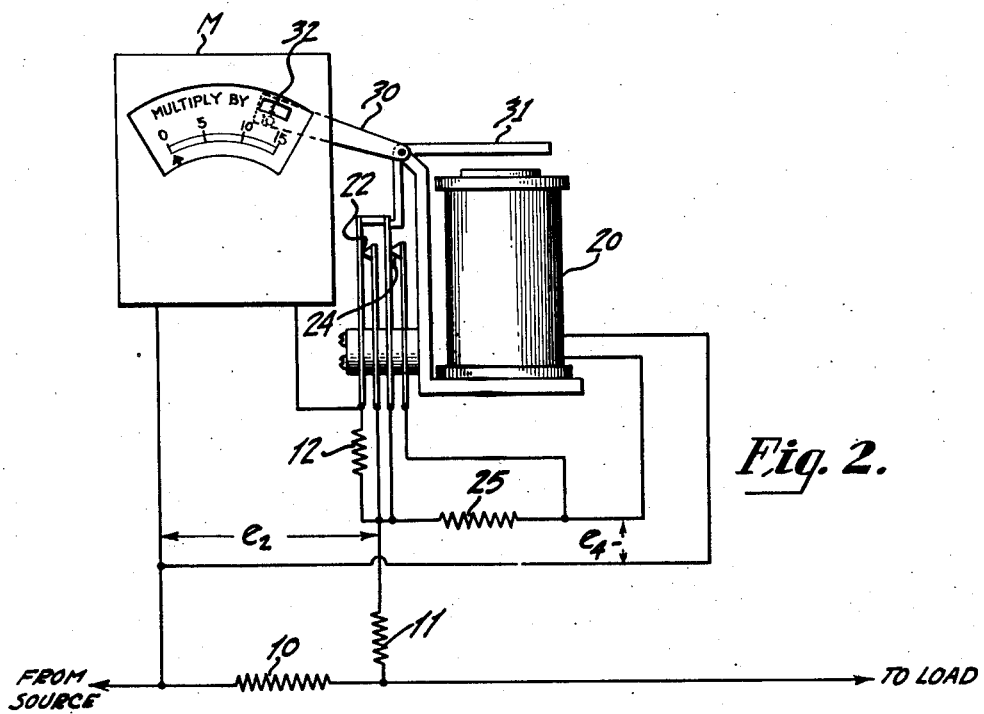
INVENTOR.
Robert W. Clark
BY
ATTORNEY Patented May 14, 1946

2,400,190

UNITED STATES PATENT OFFICE 2,400,190

MULTIRANGE METER

Robert W. Clark, Teaneck, N. J., assignor to Radio Corporation of America, a corporation of Delaware Application January 12, 1944, Serial No. 517,957

3 Claims. (Cl. 171—95)

The present invention relates to multi-range meters and, more particularly, to meter systems which automatically select the proper scale to produce easier reading on the meter.

An object of the present invention is the provision of a meter circuit capable of indicating any of several scale readings, automatically selecting the proper scale for maximum ease in reading.

A further object of the present invention is the provision of a meter circuit which protects the meter movement against any but gross overloads.

The foregoing objects, and others which may appear from the following detailed description, are accomplished by providing a single meter of the desired sensitivity to cover the lower of the two scale ranges and, further, providing a relay which operates at a certain voltage and releases at a lower voltage, these voltages being such that for increasing scale readings at the higher voltage a multiplying resistance is placed in the meter circuit, while for decreasing scale readings the multiplying resistor is maintained in the circuit until the lower voltage is reached before the scale reading is changed.

The present invention will be more fully understood by reference to the following detailed description which is accompanied by a drawing in which:

Figure 1 illustrates in diagrammatic form a portion of a circuit including a meter adapted to read two current ranges by appropriate selection of series resistances; while Figure 2 illustrates an embodiment of the present invention wherein the selection is automatically accomplished.

In Figure 1 there is shown a current supply lead from a source to a current load. In series with this current supply lead is a resistor 10. The voltage drop across resistor 10 is applied to a meter M through series resistors 11 and 12. Resistor 12 is arranged to be shunted by a push-button switch 13 for increasing the sensitivity of meter M. Resistances 10, 11 and 12 are so arranged that the meter M, for example, shows a full scale deflection for a current of 150 milliamperes flowing from the source to the load. Now, if less than 15 milliamperes is flowing in the current supply lead, the meter M will be difficult to read accurately. However, if resistor 12 is short-circuited by means of push-button switch 13, the sensitivity of meter M may be increased so that it gives a full scale indication for 15 milliamperes. The desired results may be obtained, when using a 1.5 milliamperes meter having a resistance of 40 ohms or thereabouts, if resistor 10 has a value of 10 ohms, resistor 11, 50 ohms and resistor 12, 900 ohms. These resistor values will be modified depending on the current through the relay coil.

In Figure 2 a relay 20 is provided having a pair of normally closed contacts 22 and 24. Contacts 22 are shunted across the resistor 12 which changes the sensitivity of the meter from 15 to 150 milliamperes. Contacts 24 are connected across a resistor 25 in series with the actuating winding of relay 20. The actuating winding of the relay is so arranged that the relay will operate on, for example, .06 volt. Thus, when the load current increases above 15 milliamperes the voltage drop $e_2$ from the junction between resistors 11 and 12 to the source side of resistor 10 becomes greater than .06 volt and the relay contacts 22 and 24 are opened. This inserts the resistor 12 in the meter circuit, shifting the full scale sensitivity of the meter from 15 to 150 milliamperes. At the same time resistance 25 is inserted in the relay operating circuit so as the load current decreases from a value above 15 milliamperes to a predetermined lower value, say 10 milliamperes, that at this current the voltage drop $e_4$ across the relay winding is such that the relay will become inoperative, thus closing contacts 22 and 24 and returning the meter to the 15 milliampere full scale sensitivity.

The relay 20 is preferably a fast acting one so that if the load current suddenly increases to the order of 150 milliamperes, the relay operates before the meter M can be damaged.

I have shown in Figure 2 one means by which the scale in use can be indicated. An extension 30 is provided on the armature 31 of relay 20 which extends back of an aperture 32 on the scale of meter M. The words "multiply by" are printed to the left of aperture 32 and the armature extension 30 carries the figures 1 and 10 on the end in such positions that when the relay armature 31 is not operated, the numeral "1" appears in aperture 32, and when the relay armature 31 is actuated, numeral "10" appears. If desired, the relay armature extension 30 may extend the full length of the meter dial, and each of the major scale graduations on the meter dial may be replaced by apertures similar to aperture 32. The extension arm 30 may then carry two sets of numbers adapted to be selectively displayed in the apertures on the meter dial in accordance with the position of the relay armature arm 31.

It is contemplated as being within the scope of the present invention to permanently wire resistor 10 into a circuit in which the current is to be measured, with a jack connected across the resistor and the remainder of the meter organization, including meter M, relay 20 and the associated resistors in a separate portable case which is provided with a plug for connection across resistor 10 when desired. Thus a single meter organization may be used to measure currents in different equipment units.

While I have illustrated a particular embodiment of the present invention, it should be clearly understood that it is not limited thereto since many modifications may be made in the several elements employed and in their arrangement, and it is therefore contemplated by the appended claims to cover any such modifications as fall within the spirit and scope of the invention.

Having now described my invention, what I claim as new and desire to have protected by Letters Patent is:

1. A current measuring system including a series resistor connected in a circuit carrying the current to be measured, a meter adapted to measure the potential drop across said resistor, a relay having an armature adapted to operate a pair of normally closed contacts and an actuating winding, said actuating winding being connected across said meter and adapted to operate for applied potentials sufficient to cause full scale deflection of said meter, one of said pair of contacts being shunted across an additional series multiplying resistor for said meter and the other of said pair of contacts being shunted across a resistor connected in series with said actuating winding.

2. A current measuring system including a series resistor connected in a circuit carrying the current to be measured, a meter adapted to measure the potential drop across said resistor, a relay having an armature adapted to operate a pair of normally closed contacts and an actuating winding, said actuating winding being connected across said meter and adapted to operate for applied potentials sufficient to cause full scale deflection of said meter, one of said pair of contacts being shunted across a resistor connected in series with said actuating winding, said relay armature carrying an extension arm in cooperative relationship with the dial of said meter and adapted to change the value of the calibrations on said dial as said armature is operated.

3. A current measuring system including a series resistor connected in a circuit carrying the current to be measured, a meter adapted to measure the potential drop across said resistor, a relay having an armature adapted to operate a pair of normally closed contacts and an actuating winding, said actuating winding being connected across said meter and adapted to operate for applied potentials sufficient to cause full scale deflection of said meter, one of said pair of contacts being shunted across a resistor connected in series with said actuating winding, said meter having a dial with an aperture therein and said relay arm carrying an extension arm operating back of said aperture to selectively display different multiplying factors for said meter scale as said relay is operated.

ROBERT W. CLARK.